United States Patent
Tsen

(10) Patent No.: US 6,865,773 B2
(45) Date of Patent: Mar. 15, 2005

(54) STEAM CLEANING DEVICE WITH A BUILT-IN STORAGE FOR POWER CORD AND BRUSHES AND CONVERSION CONNECTORS

(76) Inventor: Samson Tsen, 8, Lane 249, Lung-Chiang Rd., Chung-Shan Dist., Taipei (TW)

( * ) Notice: Subject to any disclaimer, the term of this patent is extended or adjusted under 35 U.S.C. 154(b) by 343 days.

(21) Appl. No.: 10/139,401

(22) Filed: May 7, 2002

(65) Prior Publication Data

US 2003/0208872 A1 Nov. 13, 2003

(51) Int. Cl.⁷ .............................................. A47L 11/34
(52) U.S. Cl. .......................... 15/323; 15/321; 15/328; 15/339
(58) Field of Search ........................ 15/321, 323, 339, 15/DIG. 10, 328; 392/400, 403–406; 38/75, 77.6, 85, 96; 66/222; 219/245, 247, 259

(56) References Cited

U.S. PATENT DOCUMENTS

| | | | | |
|---|---|---|---|---|
| 2,521,178 A | * | 9/1950 | Moletti | 15/323 |
| 2,573,091 A | * | 10/1951 | Brown, Jr. | 15/323 |
| 3,253,294 A | * | 5/1966 | Waters | 15/323 |
| 5,224,237 A | * | 7/1993 | Ambrosiano | 15/339 |
| 5,247,719 A | * | 9/1993 | Wareham et al. | 15/323 |
| 5,400,462 A | * | 3/1995 | Amoretti | 15/321 |
| 5,749,120 A | * | 5/1998 | Amoretti | 15/339 |
| 5,937,476 A | * | 8/1999 | Kim | 15/323 |
| 6,061,935 A | * | 5/2000 | Lee | 68/222 |
| 6,295,691 B1 | * | 10/2001 | Chen | 15/321 |
| 6,484,348 B1 | * | 11/2002 | Paterson et al. | 15/323 |

* cited by examiner

Primary Examiner—Theresa T. Snider
(74) Attorney, Agent, or Firm—Birch, Stewart, Kolach & Birch, LLP

(57) ABSTRACT

A steam cleaning device with a built-in storage for a power cord, brushes and conversion connectors can change steam output devices by switching a first conversion connector with a second conversion connector to achieve multiple function with the same device. The device further has a winding box and a brush compartment to store the power cord and various types of brushes in one body to save storage space.

11 Claims, 11 Drawing Sheets

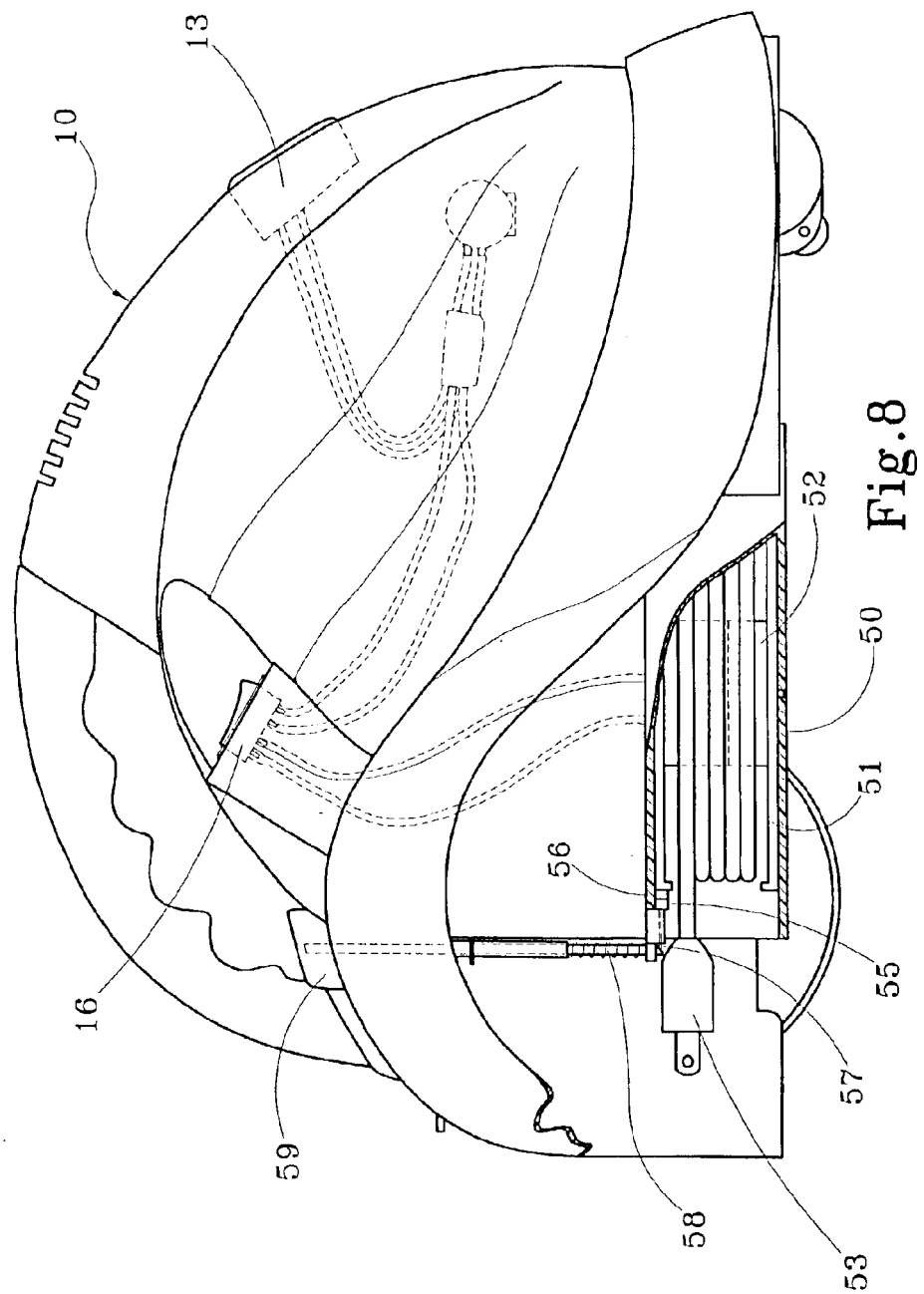

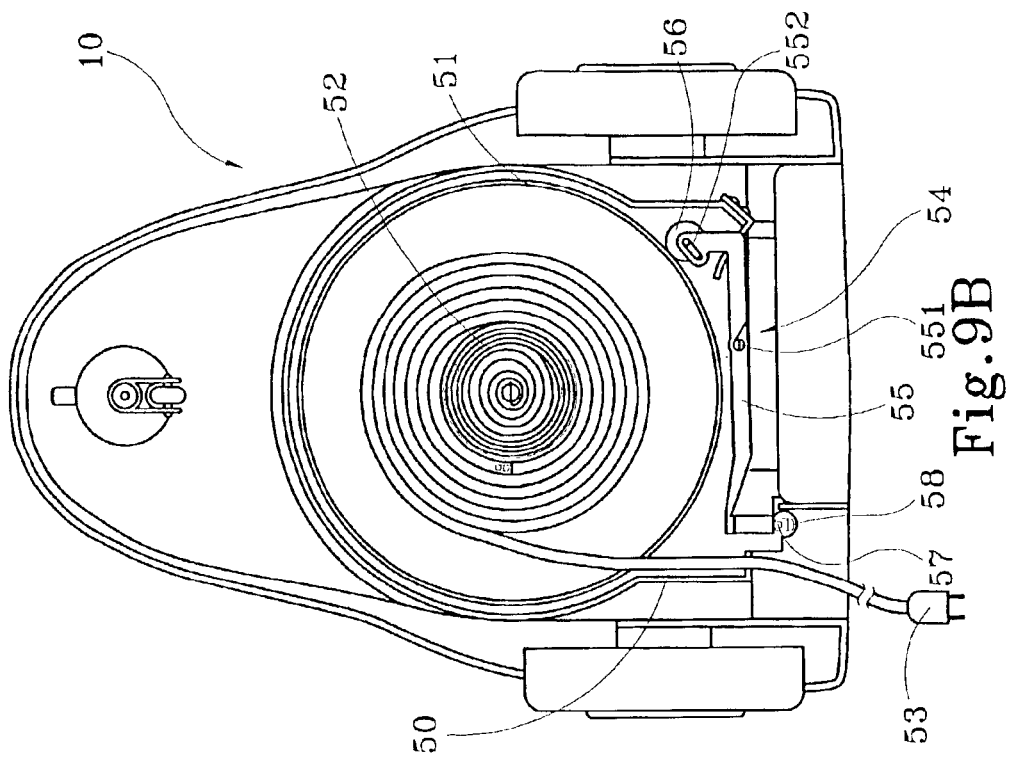
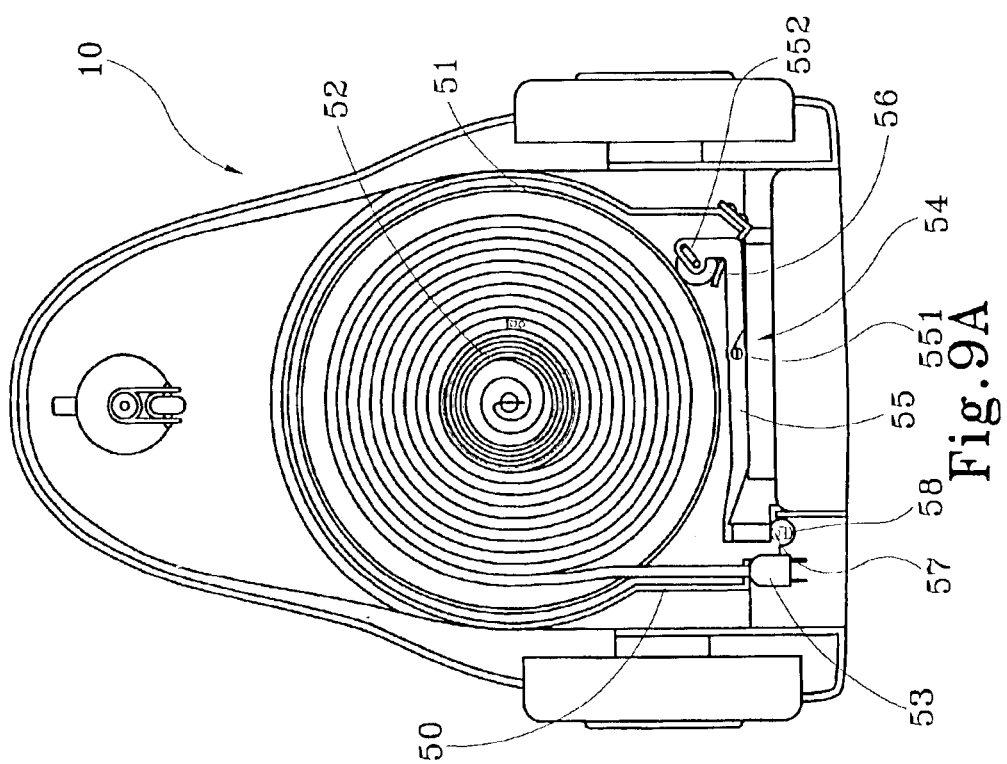

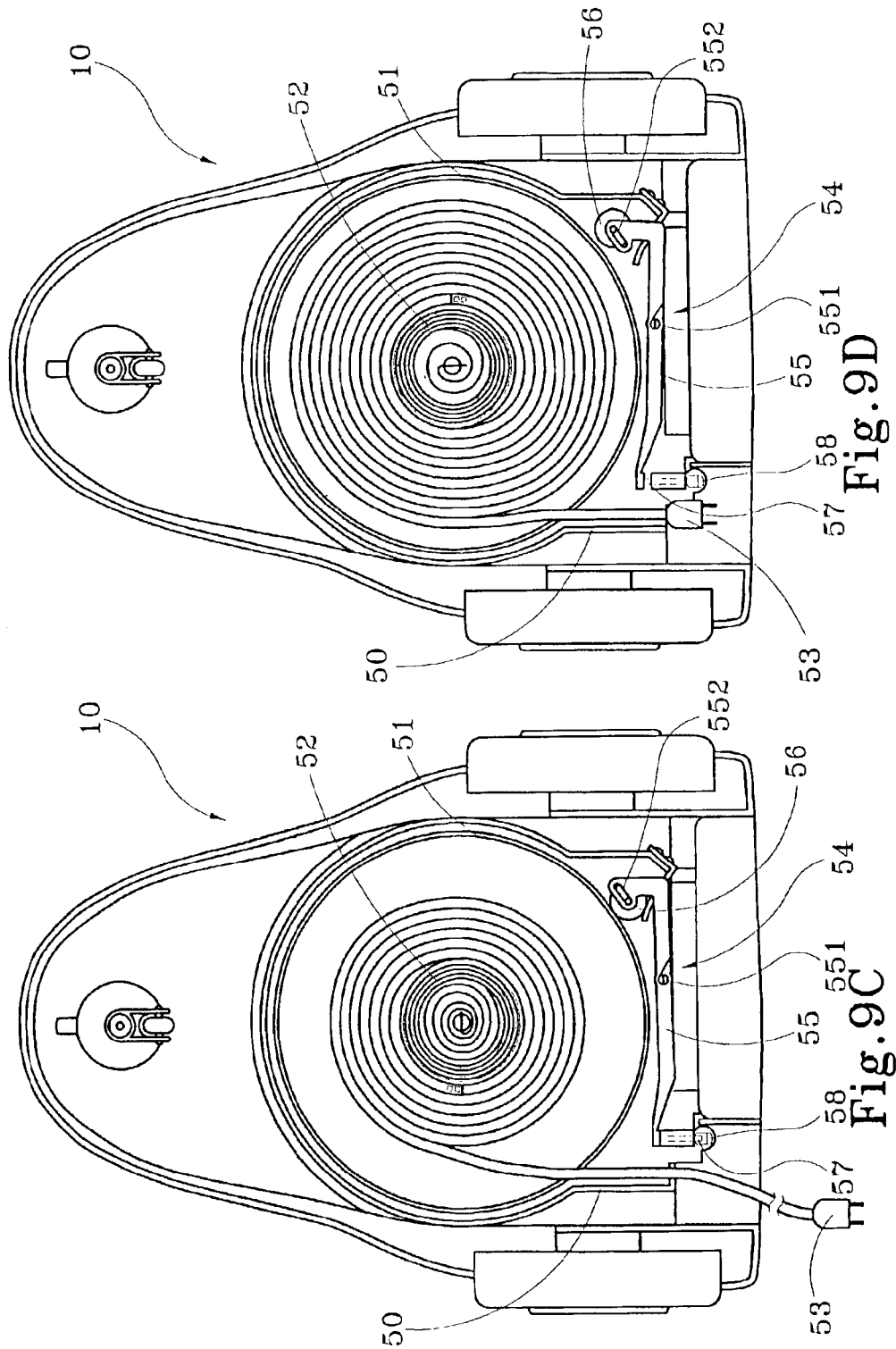

STEAM CLEANING DEVICE WITH A BUILT-IN STORAGE FOR POWER CORD AND BRUSHES AND CONVERSION CONNECTORS

FIELD OF THE INVENTION

The present invention relates to a steam cleaning device with a built-in storage for power cord and brushes and conversion connectors, and particularly to a steam cleaning device for generating high temperature steam to perform heavy duty cleaning function.

BACKGROUND OF THE INVENTION

In a growing number of households these days, steam cleaning devices that generate high temperature steam to dissolve greasy dirt have replaced chemical detergents to clean and remove stubborn greasy dirt and filthy stains accumulating on smoke exhaust fans, gas stoves, bathtubs or the likes. However most steam cleaning devices now available on the market can provide only single function. There are still many problems remained to be overcome, notably:

1. When using the steam cleaning device to generate high temperature steam to dissolve dirt, different types of dirt require different type of brushes. At present, most steam cleaning devices have included brush sets as accessories. And separate brush containers are provided to hold these brushes. After consumers bought the steam cleaning devices, the devices and the brush containers are often stored separately at home. As heavy duty cleaning chores that require steam cleaning devices and brushes are not being done frequently, not daily or even weekly, it could happen that the brush containers are stored at different locations from where the steam cleaning devices are stored. It is not uncommon that users often have to spend a lot of time and take a lot of troubles to search and gather all these cleaning gears together. It is an annoyance to many consumers. Moreover, the brush containers need extra storage space, and could become a trouble to many people.

2. The high temperature steam products, besides steam cleaning devices for performing cleaning function, also include platform steam irons or vertical type steam irons for removing wrinkles and creases from clothes. From users' standpoints, all these steam products generally adopt same or similar principle and provide similar functions. To purchase these products individually not only cost a lot of money, it also creates a lot of storing problems in the houses.

3. Exposed power cords often create untidy living environments. Moreover, power cords exposed outside for a long period of time often gather dusts and dirt, and the outer skin of power cords is prone to damage by incidental impact or cutting, and results in naked conductive wire. It could cause electric shock and hurt people, thus has safety concerns.

SUMMARY OF THE INVENTION

Therefore the primary object of the invention is to resolve aforesaid disadvantages. The invention mainly aims at providing a steam cleaning device with a built-in storage for power cord and brushes and conversion connectors. The cleaning device of the invention includes a first conversion connector and a second conversion connector that can be easily switched to change a steam out device to a steam iron or other devices of similar functions to achieve one-body-multiple-function effect. And through the design of a winding box and a brush compartment, various types of brushes and the power cord that are most bulky and difficult to manage can be housed neatly in one body to form a multifunctional device to save space.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 8 is a schematic view of the invention, showing a winding box.

FIGS. 9A through 9D are schematic views of the invention, showing power cord winding conditions.

DESCRIPTION OF THE PREFERRED EMBODIMENTS

Figure 1:
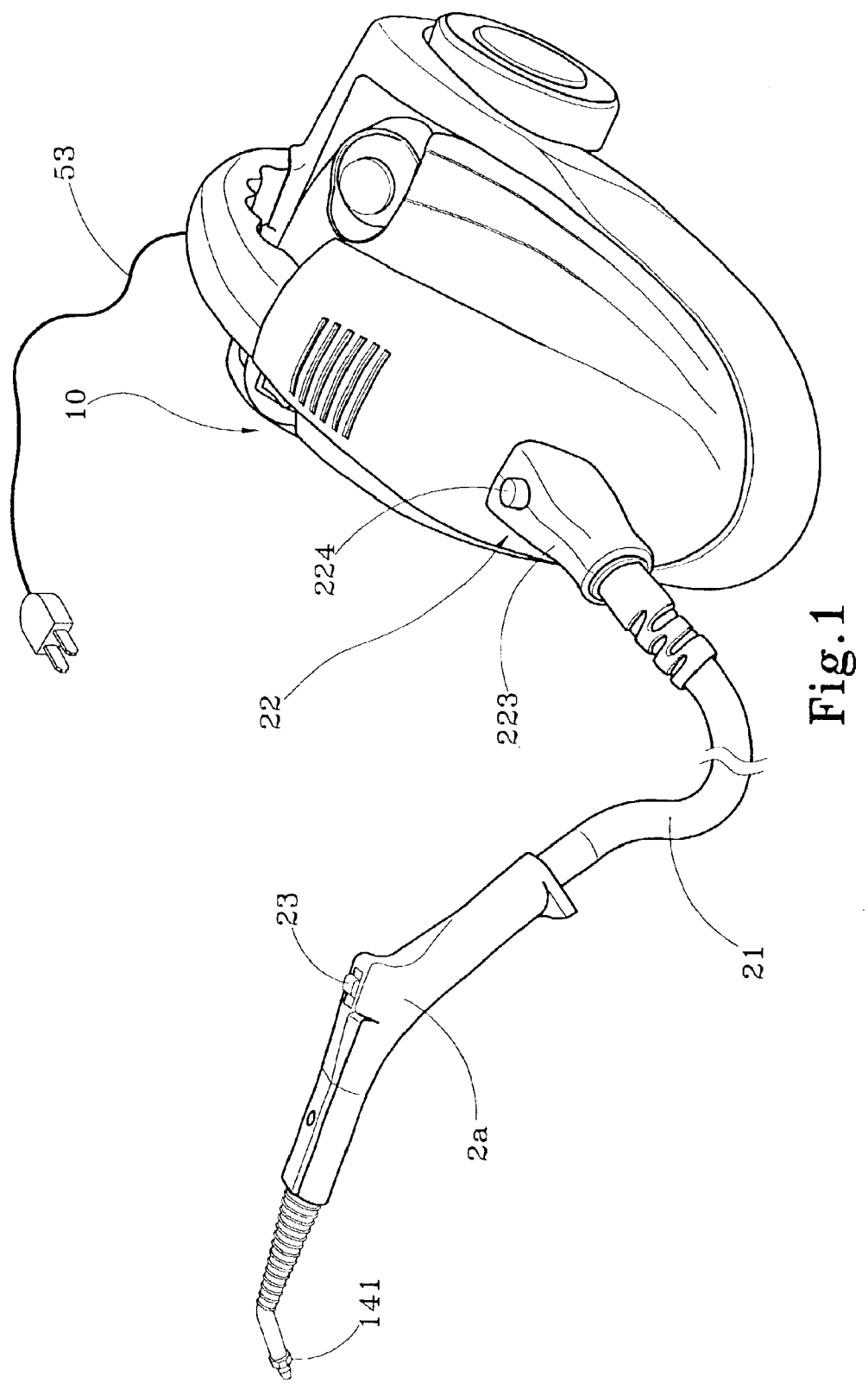
FIG. 1 is a perspective view of the invention.
Figure 2:
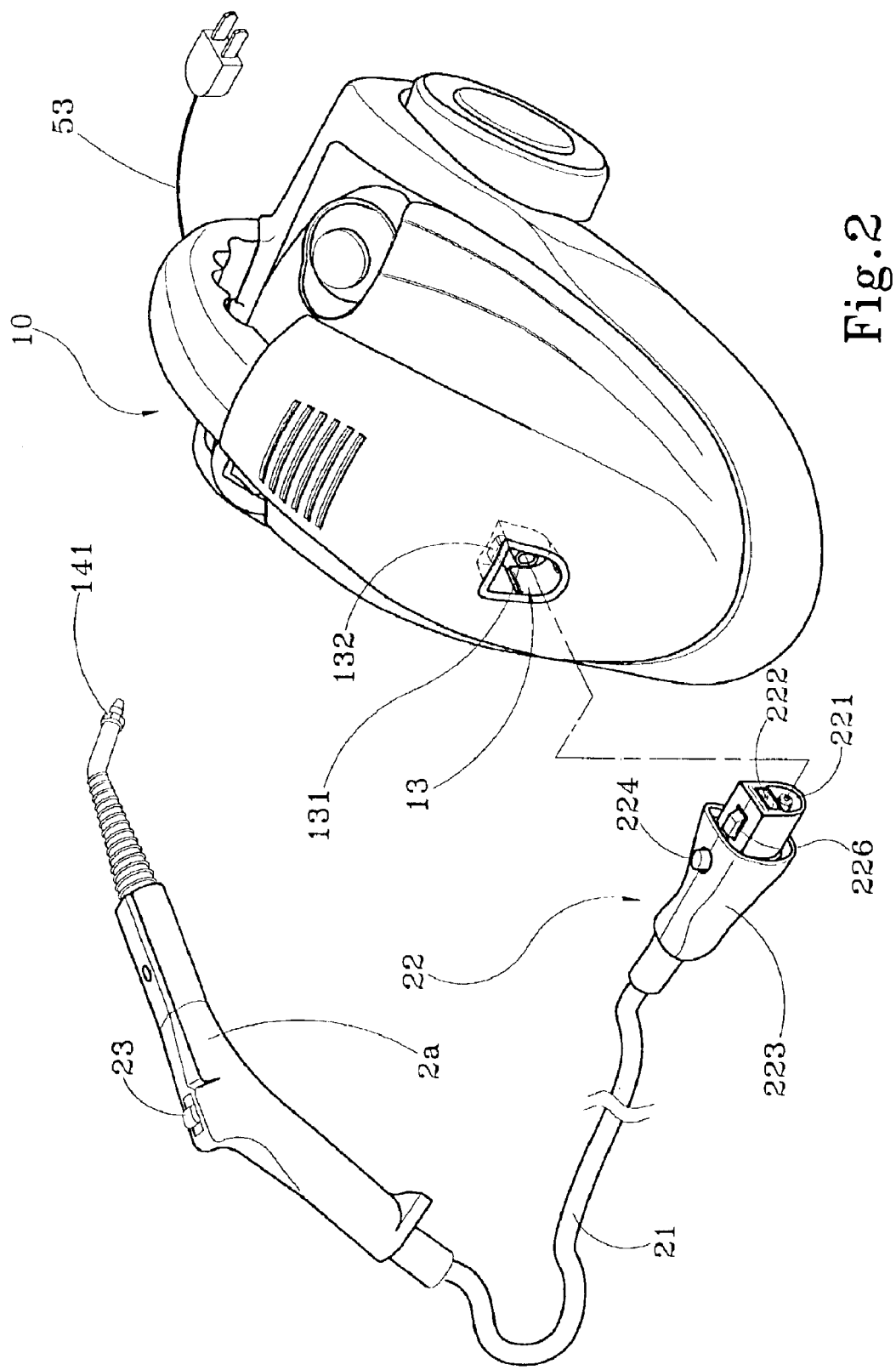
FIG. 2 is an exploded view of a first conversion connector and a second conversion connector of the invention.
Figure 3:
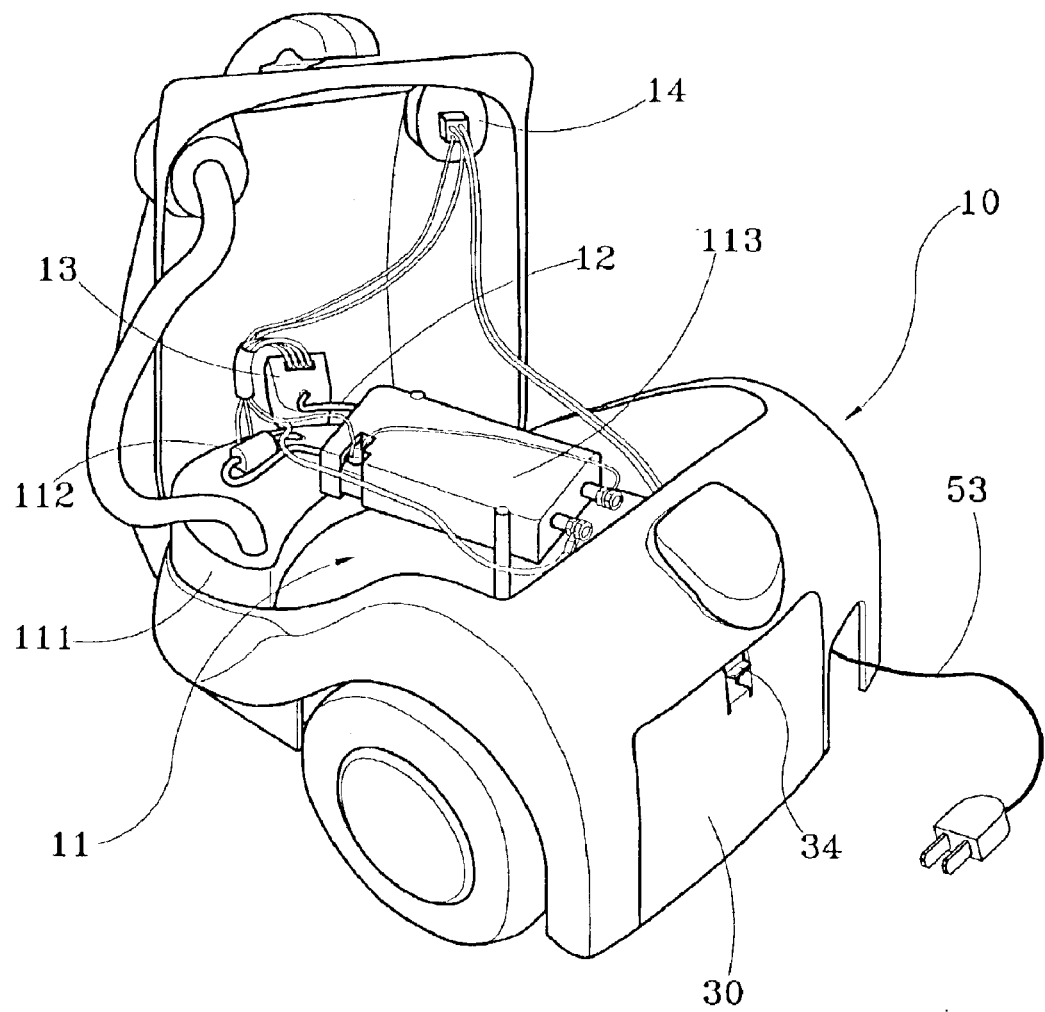
FIG. 3 is a schematic view of a heater of the invention.

Referring to FIGS. 1, 2, and 3, the steam cleaning device 10 of the invention includes a heating device 11 for vaporizing water to steam. The heating device 11 includes a water tank 111, a pump 112 for pumping water in the water tank 111 and a heater 113 for receiving water and heating the water to become steam (at present heating methods for the steam cleaning device 10 generally can be grouped to boiler type and heating pipe type. The invention adopts the heating pipe type. These heating methods are known in the art and form no part of the invention, thus their details are omitted here). The heating device 11 extends to form a first duct 12 as a steam passage. The steam cleaning device 10 has a first conversion connector 13 which includes a first steam unit 131 coupling with the first duct 12 and a first power supply unit 132 connecting to a power supply 16 of the steam cleaning device 10. The steam cleaning device 10 connects to a steam output device 2a through a second duct 21. The second duct 21 has one end engaged with a second conversion connector 22 which may be coupled with the first conversion connector 13. The second conversion connector 22 has a second steam unit 221 to couple with the first steam unit 131 and a second power supply unit 222 to couple with the first power supply unit 132.

Figure 4A:
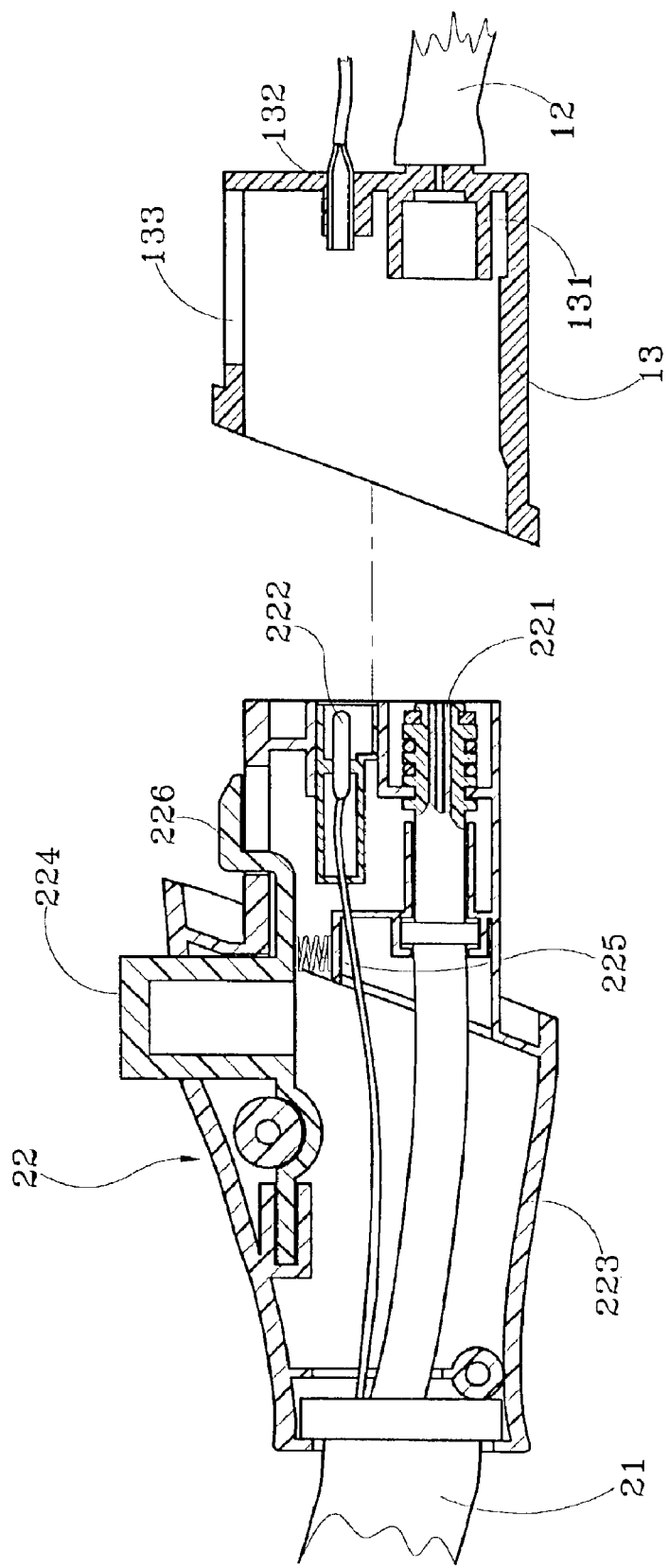
FIGS. 4A and 4B are schematic views of the first and second conversion connectors of invention, showing coupling conditions.
Figure 4B:
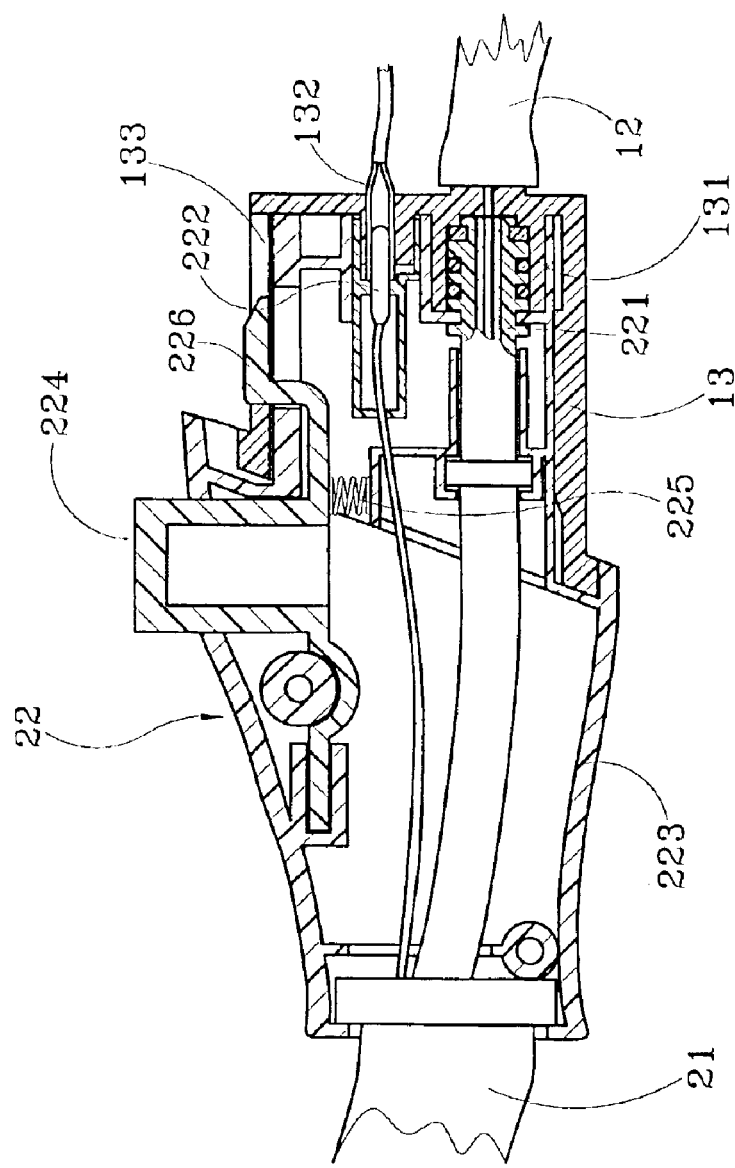

Referring to FIGS. 4A and 4B, when users want the function of cleaning or ironing clothes, a desired steam output device 2a or 2b may be selected. To make connection to a selected steam output device, couple the second conversion connector 22 with the first conversion connector 13. The second conversion connector 22 consists of two half casings 223 with a pushbutton 224 located thereon. Below the pushbutton 224, there is an elastic element 225. The pushbutton 224 has a lower section extending upwards to form a latch section 226. When the pushbutton 224 is depressed, the elastic element 225 is compressed and the latch section 226 is moved downwards. The second power supply unit 222 and the second steam unit 221 of the second conversion connector 22 may be matched and coupled respectively with the first power supply unit 132 and the first steam unit 131 of the first conversion connector 13. When the second conversion connector 22 and the first conversion connector 13 are fully coupled, the latch section 226 of the second conversion connector 22 is pushed by the restoring force of the elastic element 225 and moved up to its original location to latch on a latch slot 133 formed on the first conversion connector 13 and corresponding to the latch section 226.

Referring to FIG. 1, the steam output device 2a may be a steam gun, and the electric connection of the first and second power supply units 132 and 222 may serve to start or cutoff control signals for the heating device 11. Through a control button 23 located on the steam output device 2a, steam flow may be controlled to eject continuously or intermittently, or stopped. By connecting the first and second power supply units 132 and 222 to the power supply 16 of the steam cleaning device 10, the heating device 11 may be controlled to heat water to become steam. Through the first and second ducts 12 and 21, and the first and second steam units 131 and 221, steam may be ejected through an outlet of the steam output device 2a to perform cleaning function for selected objects. Hence the steam output device 2a enables the steam cleaning device 10 to maintain existing built-in functions.

Figure 5:
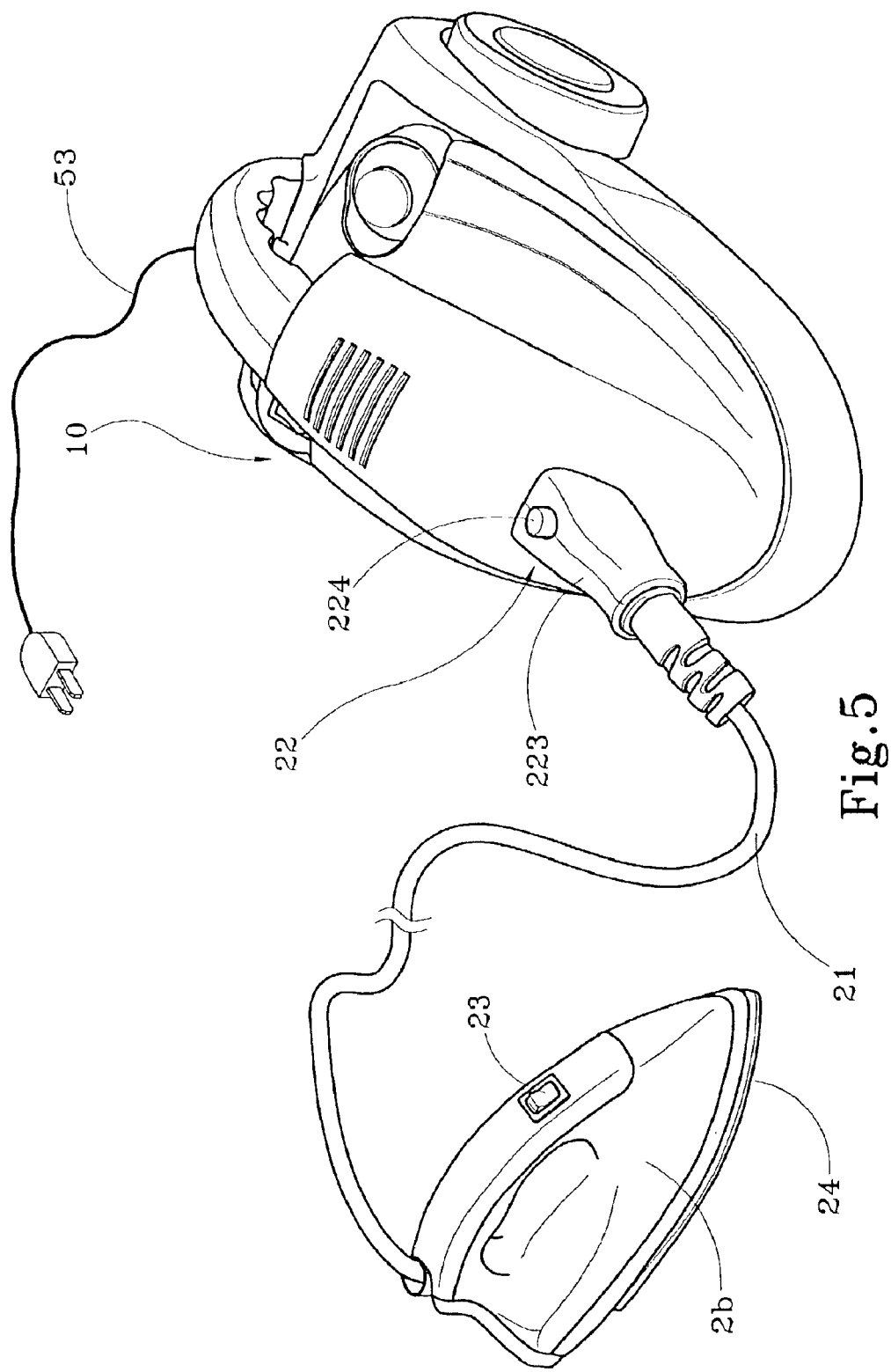
FIG. 5 is a schematic view of another embodiment of the invention.

Referring to FIG. 5, the steam output device 2b is a steam iron. In such a circumstance, electric connection of the first and second power supply units 132 and 222, in addition to starting or cutting off control signals for the heating device 11, also provides electric power supply for preheating the iron soleplate 24. When the first and second conversion connectors 13 and 22 are coupled, the steam output unit 2b obtains electric power from the power supply 16 of the steam cleaning device 10 through the first and second power supply units 132 and 222, and the soleplate 24 starts to heat. Steam output and ejection from the steam output device 2b also is controlled by the control button 23 and may have continuous, intermittent, or stop selections. Thus through the first and second ducts 12 and 21, and the first and second steam units 131 and 221, steam may be ejected through an outlet of the steam output device 2b to perform ironing function for clothes. Hence the steam output device 2b may provide steam iron functions.

Figure 6:
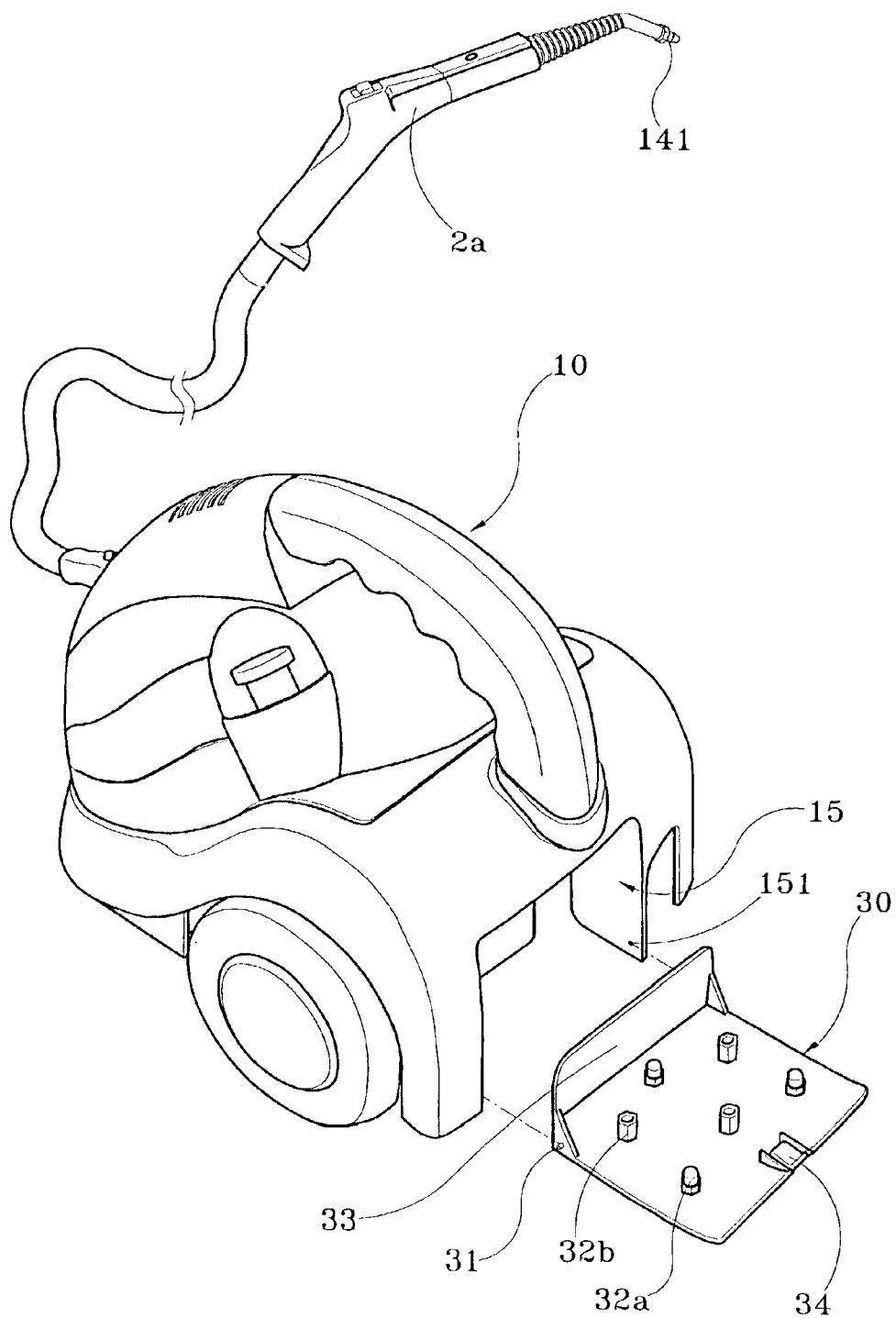
FIG. 6 is a schematic view of the invention, with the brush compartment detached.
Figure 7:
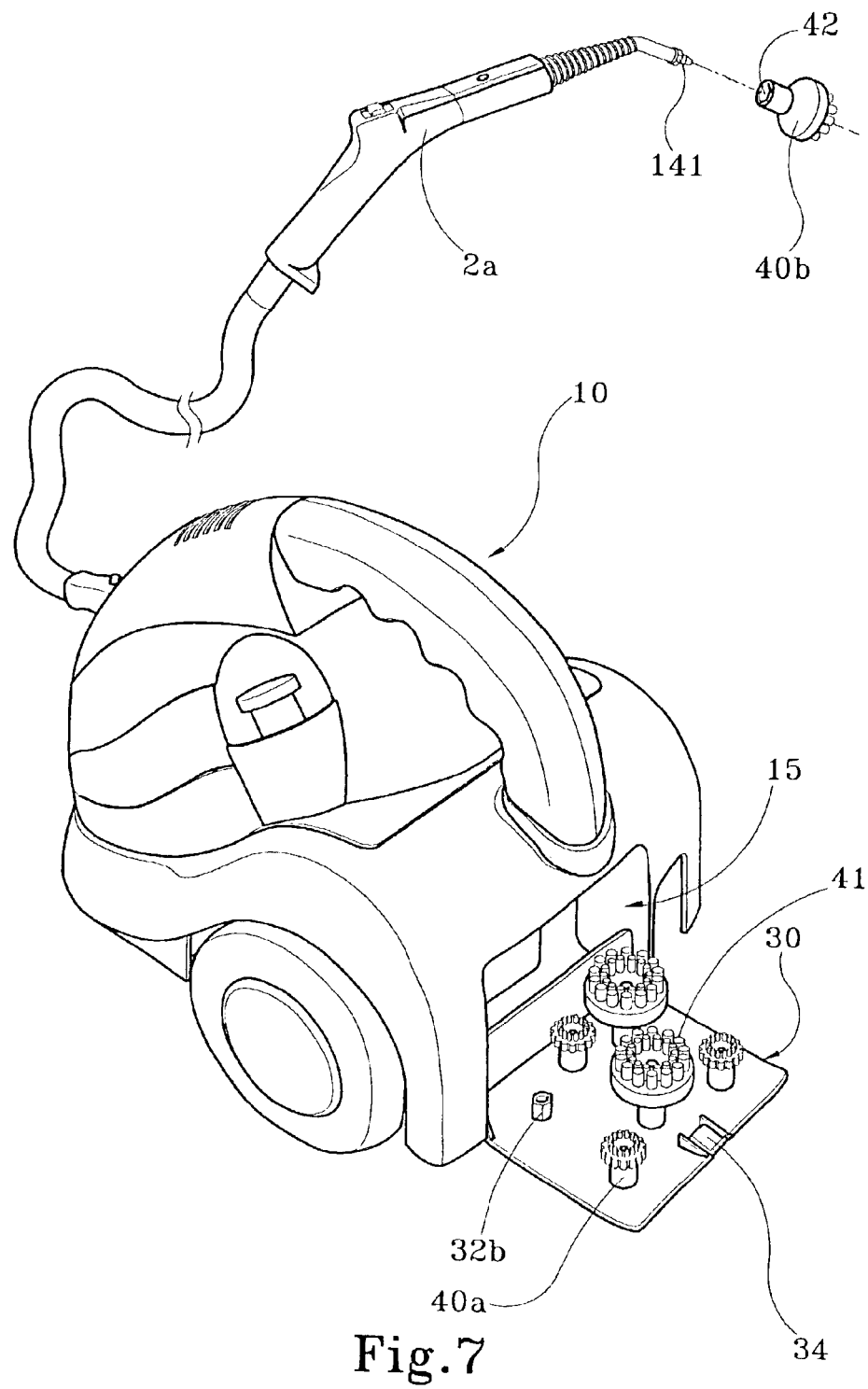
FIG. 7 is a schematic view of the invention, with the brush compartment opened.

Referring to FIGS. 6 and 7, the steam cleaning device 10 also has a housing chamber 15 for storing brushes 40a and 40b. In the housing chamber 15, there is a brush compartment 30 which has a retaining section 33 extending from one side thereof to prevent the brushes 40a and 40b from dropping out. In order to facilitate users operation and retrieval of brushes, the brush compartment 30 is adopted a hatch type design. The housing chamber 15 also has an anchoring section 151, and the brush compartment 30 has a latch section 31 corresponding to and matching the anchoring section 151 to form a cavity and a stub shaft 57 in a pivotal engaging relationship. Thereby the brush compartment 30 may be pivotally turned about the anchoring section 151 with the latch section 31 functioning as a fulcrum so that the housing chamber 15 may be turned like a hatch door in of the steam cleaning device 10. In the brush compartment 30, there are a plurality of holding zones 32a and 32b for holding various types of brushes 40a and 40b. In order to facilitate coupling of the brushes, the front tip of the steam gun is fastened to a hexagonal sleeve 141, and the brushes 40a and 40b have respectively a hexagonal trough 42 formed in the bottom section thereof to couple with the hexagonal sleeve 141. When users want to use the steam cleaning device 10 to perform heavy duty cleaning jobs and a brush 40a or 40b must be coupled to use in high temperature steam to dissolve and remove dirt simultaneously, the brush may be directly and handily retrieved from the brush compartment 30 by depressing an elastic plastic snap latch 34 formed on the brush compartment 30 to open thereof. The brush compartment 30 may be turned about the latch section 31 and anchoring section 151 and opened as previously discussed. As shown in the drawings, in the brush compartment 30, the bristle side 41 of the brushes 40a and 40b is facing upwards. Users can easily identify and take the desired one. When usage is finished, the brushes 40a and 40b may be placed back in the brush compartment 30 and stored without the concern of losing, therefore provide most convenient operation.

Referring to FIG. 8, the steam cleaning device 10 of the invention further has a winding box 50 fixedly attaching to the exterior thereof. The winding box 50 includes a winch 51 which has a winding elastic element 52 made of a coil spring located therein. The winding elastic element 52 connects to a power cord 53 linking to the power supply 16 for providing power required by the steam cleaning device 10. The winding box 50 further has a harness mechanism 54 to rein turning of the winch 51. The harness mechanism 54 includes a displacement element 55 which has a pintle 551 located in a middle section thereof. The displacement element 55 has one end formed as a displacement slot 552 to couple with a roller 56 to press against the winch 51, and another end forming a strut 57. The strut 57 connects to a control bar 58 which has a top end extending through the steam cleaning device 10 to couple with a pushbutton 59.

Referring to FIG. 9A, when an user wants to pull out the power cord 53 to plug into the power supply 16, pulls the power cord 53 outwards, the roller 56 is pushed by the turning winch 51 to move in the displacement slot 552 to a position without harnessing the winch 51. The power cord 53 may be pulled out freely, and the winding elastic element 52 is compressed to store elastic force (as shown in FIG. 9B). When the user has pulled out enough length of power cord 53 and stops the pulling force, the roller 56 returns to its original position and presses and reins the winch 51 from turning (as shown in FIG. 9C). When the user completes usage of the steam cleaning device 10, presses the pushbutton 59, the control bar 58 is moved to press the strut 57 inwards, and the displacement element 55 rocks about the pintle 551 (as shown in FIG. 9D), the displacement slot 552 and the roller 56 are moved away from the winch 51, hence the elastic force previously stored in the winding elastic element 52 is released to turn the winch 51 in the reverse direction to wind and store the power cord 53.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steam cleaning device with a built-in storage for a power cord and brushes and conversion connectors, comprising:

a steam cleaning housing including a heating device for vaporizing water to become steam, the heating device being extended to form a first duct, the steam cleaning housing further having a first conversion connector which includes a first steam unit coupling with the first duct and a first power supply unit coupling with a power supply of the steam cleaning housing, and a chamber for holding brushes, the chamber having an anchoring section;

a steam output device having a second duct coupling with the steam cleaning device, the second duct having one end fastened to a second conversion connector matching and coupling with the first conversions connector, the second conversion connector having a second steam unit corresponding to the first steam unit and a second power supply unit corresponding to the first power supply unit;

a brush compartment located in the chamber having a latch section corresponding to and engaging with the anchoring section, and a plurality of holding zones for holding various types of brushes; and a winding box fixedly attached to the exterior of the steam cleaning device including a winch which has a winding elastic element, the winding elastic element connecting to a power cord linking to the power supply for providing power required by the steam cleaning deceive, the winding box further having a harness mechanism to rein turning of the winch, the second conversion connector includes two half casings with a pushbutton located therebetween, the pushbutton being in contact with an elastic element located therebelow and having a lower section extending upwards to form a latch section, the first conversion connector having a latch slot corresponding to the latch section.

2. The steam cleaning device of claim 1, wherein the steam output device is a steam gun.

3. The steam cleaning device of claim 1, wherein the steam output device is a steam iron.

4. The steam cleaning device of claim 1, wherein the fist power supply unit and the second power supply unit establish an electric connection, the electric connection provides power on/off signals for activating or stopping operation of the heating device.

5. The steam cleaning device of claim 4, wherein the steam output device has a control button for controlling the signals for activating or stopping operation of the heating device.

6. The steam cleaning device of claim 1, wherein the heating device includes a water tank, a pump for pumping water in the water tank and a heater for heating water to become steam.

7. The steam cleaning device of claim 1, wherein the latch section has a stub shaft to pivotally engage the anchoring section.

8. The steam cleaning device of claim 1, wherein the holding zones are hexagonal struts.

9. The steam cleaning device of claim 1, wherein the brush compartment has a slit elastic snap latch for latching the brush compartment on the housing steam cleaning device.

10. The steam cleaning device of claim 1, wherein the winding elastic element is a coil spring.

11. The steam cleaning device of claim 1, wherein the harness mechanism includes a displacement element which has a pintle located in a middle section thereof, the displacement element having one end formed as a displacement slot to couple with a roller to press against the winch, and another end forming a strut to connect a control bar which has a top end extending through the steam cleaning device to couple with a pushbutton.

* * * * *